United States Patent
Fatemi et al.

(10) Patent No.: US 9,465,614 B2
(45) Date of Patent: Oct. 11, 2016

(54) PARALLEL EXECUTION OF INSTRUCTIONS IN PROCESSING UNITS AND ADJUSTING POWER MODE BASED ON MONITORED DATA DEPENDENCY OVER A PERIOD OF TIME

(71) Applicant: NXP B.V., Eindhoven (NL)

(72) Inventors: Hamed Fatemi, Eindhoven (NL); Jose Pineda de Gyvez, Eindhoven (NL); Juan Echeverri Escobar, Eindhoven (NL)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 14/195,657

(22) Filed: Mar. 3, 2014

(65) Prior Publication Data
US 2014/0258686 A1    Sep. 11, 2014

(30) Foreign Application Priority Data

Mar. 7, 2013    (EP) .................................... 13158209

(51) Int. Cl.
| | | |
|---|---|---|
| G06F 9/30 | (2006.01) | |
| G06F 1/32 | (2006.01) | |
| G06F 9/38 | (2006.01) | |

(52) U.S. Cl.
CPC .......... *G06F 9/30145* (2013.01); *G06F 1/324* (2013.01); *G06F 1/329* (2013.01); *G06F 1/3243* (2013.01); *G06F 1/3287* (2013.01); *G06F 1/3293* (2013.01); *G06F 1/3296* (2013.01); *G06F 9/30189* (2013.01); *G06F 9/3836* (2013.01); *G06F 9/3869* (2013.01); *G06F 9/3885* (2013.01); *Y02B 60/121* (2013.01); *Y02B 60/1217* (2013.01); *Y02B 60/1239* (2013.01); *Y02B 60/1282* (2013.01); *Y02B 60/1285* (2013.01); *Y02B 60/144* (2013.01)

(58) Field of Classification Search
CPC ...... G06F 1/32–1/3212; G06F 1/3234–1/324; G06F 1/3287–1/3296; G06F 9/3818; G06F 9/3885; G06F 9/3836–9/3838; G06F 9/30145
See application file for complete search history.

(56) References Cited

U.S. PATENT DOCUMENTS

| | | |
|---|---|---|
| 2005/0102560 A1 | 5/2005 | Taketoshi et al. |
| 2009/0049315 A1 | 2/2009 | Diab et al. |
| 2013/0232359 A1 | 9/2013 | Fatemi et al. |

FOREIGN PATENT DOCUMENTS

| | | |
|---|---|---|
| WO | 2004/114128 A2 | 12/2004 |

OTHER PUBLICATIONS

"Pentium", 11 pgs., retrieved from the Internet Oct. 18, 2002 at: http://en.wikipedia.org/wiki/Pentium.
"PowerPC", 12 pgs., retrieved from the Internet Oct. 18, 2002 at: http://en.wikipedia.org/wiki/PowerPC.
Extended European Search Report for EP Patent Appln. No. 13158209.0 (Jul. 8, 2013).

*Primary Examiner* — Kenneth Kim

(57) ABSTRACT

An integrated circuit comprising a set of data processing units including a first data processing unit and at least one second data processing unit operable at variable frequencies is disclosed. The integrated circuit further includes an instruction scheduler adapted to evaluate data dependencies between individual instructions in a received plurality of instructions and assign the instructions to the first data processing unit and the at least one second data processing unit for parallel execution in accordance with said data dependencies. The integrated circuit is operable in a first power mode and a second power mode. The second power mode is a reduced power mode compared to the first power mode and is adapted to adjust the operating frequency of the first data processing unit and the at least one second data processing unit in the second power mode as a function of the evaluated data dependencies.

15 Claims, 5 Drawing Sheets

Figure 1:
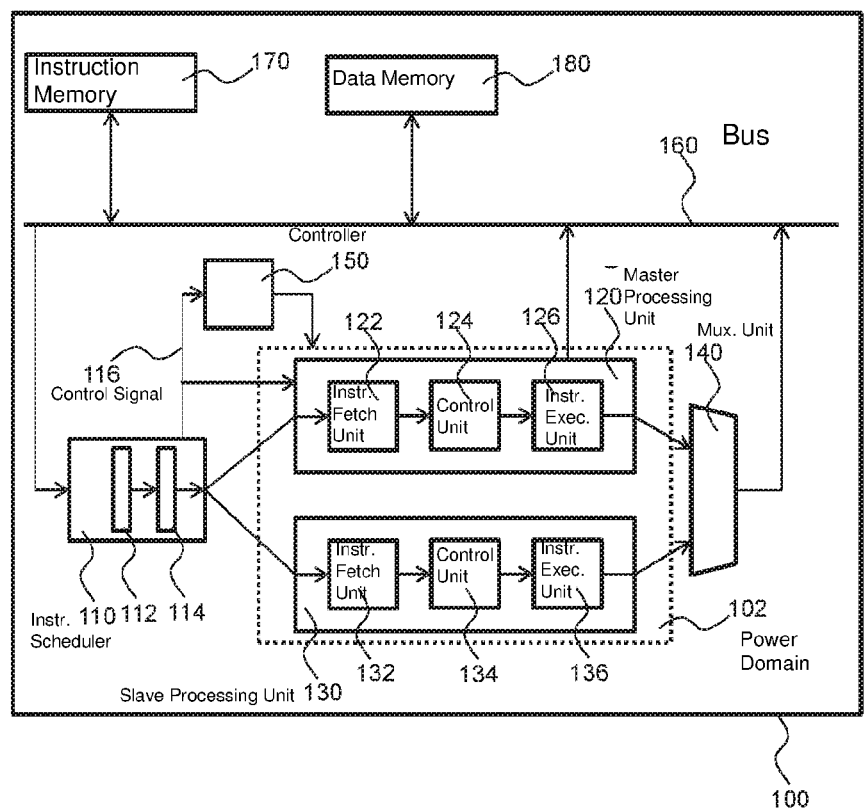

PARALLEL EXECUTION OF INSTRUCTIONS IN PROCESSING UNITS AND ADJUSTING POWER MODE BASED ON MONITORED DATA DEPENDENCY OVER A PERIOD OF TIME

CROSS-REFERENCE TO RELATED APPLICATIONS

This application claims the priority under 35 U.S.C. §119 of European patent application no. 13158209.0, filed on Mar. 7, 2013, the contents of which are incorporated by reference herein.

FIELD OF THE INVENTION

The present invention relates to an integrated circuit (IC) comprising a set of data processing units including a first data processing unit and a second data processing unit operable at variable frequencies.

The present invention further relates to an electronic device comprising such an IC.

The present invention yet further relates to a method of scheduling a plurality of instructions in a reduced power mode of an integrated circuit comprising a first data processing unit and a second processing unit.

BACKGROUND OF THE INVENTION

Over the last few decades, the development of ICs has seen the emergence of very large scale integration (VLSI) circuits in which billions of transistors are integrated on modest silicon real estate, e.g. a few millimeter squared. This mainly has been driven by the downscaling of the feature size of the semiconductor elements, e.g. transistors, used to design and manufacture such ICs.

At present, it is entirely feasible to manufacture ICs using sub-micron sized components. Indeed, ICs are being produced in technologies such as CMOS with a typical feature size of less than 100 nm, e.g. 65 or 90 nm. According to Moore's law, these feature sizes will continue to shrink in years to come.

Nevertheless, the reduction of such feature sizes is causing problems that are directly related to this reduction. The consequential increase in component density means that controlling power dissipation per unit area, e.g. heat generation, is now becoming one of the main challenges in facilitating further size reductions.

Traditionally, one of the principal design paradigms at least for ICs intended to process large volumes of digital data has been the optimization of throughput, typically through introduction of parallelism such as instruction level parallelism in which a single instruction stream is scheduled and split over multiple and independent computational units. Examples of such ICs include the Pentium® processor manufactured by the Intel Corporation and the Power PC® processor manufactured by the AIM alliance. However, in moving forward, it is unlikely that such design paradigms can be applied to further miniaturized ICs given the heat generation by such levels of parallelisms.

An approach to control the power dissipation of an IC that has gained popularity over the last decade or so is dynamic voltage and frequency scheduling (DVFS). In this approach, the operating frequency of (parts of) an IC may be reduced, e.g. by lowering the operating voltage, to reduce the power consumption of the IC. This approach unsurprisingly has proven particularly popular in application domains where power supply is limited, e.g. battery-powered electronic devices. An example of such a DVFS approach is disclosed in US2009/049314. However, DVFS is considered less suitable for application domains in which throughput performance is important due to its negative impact thereon.

SUMMARY OF THE INVENTION

The present invention seeks to provide an IC that is capable of providing a trade-off between throughput and power consumption requirements.

The present invention further seeks to provide an electronic device comprising such an IC.

The present invention yet further seeks to provide a method of scheduling a plurality of instructions in an integrated circuit comprising a first data processing unit and a second processing unit that achieves the aforementioned trade-off.

According to a first aspect, there is provided an integrated circuit comprising a set of data processing units including a first data processing unit and a second data processing unit operable at variable frequencies, and an instruction scheduler adapted to evaluate data dependencies between individual instructions in a received plurality of instructions; and assign the instructions to the first data processing unit and the at least one second data processing unit for parallel execution in accordance with said data dependencies, wherein the integrated circuit is operable in a first power mode and a second power mode, the second power mode being a reduced power mode compared to the first power mode, and is adapted to adjust the operating frequency of the first data processing unit and the at least one second data processing unit in the second power mode as a function of the evaluated data dependencies.

Consequently, in the first power mode, the first data processing unit and second data processing unit may operate at the same high frequency whether processing instructions in parallel or sequentially, whereas in the low power second power mode, the loss of throughput caused by the reduction in operating frequency is compensated by (parallel) execution of the instructions over the first and second data processing units at a frequency that is dynamically adjusted in accordance with the level of data dependency between the instructions to be executed. In this manner, it is ensured that at lower power levels throughput is maintained whilst still achieving a reduction in power consumption due to the fact that the power consumption scales with the operating voltage squared ($P \sim V_{dd}^2$).

Advantageously, the instruction scheduler is further adapted in said second power mode to generate a control signal indicative of the presence of said data dependencies, the integrated circuit further comprising a controller for adjusting said operating frequency in response to said control signal. This provides optimized IC power consumption at a desired level of throughput.

In an embodiment, the controller is further responsive to a clock signal and is adapted to determine, for a set number of clock cycles, the fraction of clock cycles in said set in which instructions without data dependencies are assigned by the instruction scheduler, and to adjust said operating frequency in accordance with said fraction following said determination. In this embodiment, the IC is operated at a constant voltage in the second power mode, which constant voltage is based on a prior evaluation of the degree of parallelism that can be achieved in the set of instructions, thereby providing an average guaranteed throughput in the second power mode. This has the advantage that a particularly stable operation of the IC in the second power mode is achieved.

The controller may be adapted to adjust said operating frequency by controlling the voltage of the data processing units in response to said control signal.

The controller may be inactive in the first power mode.

The IC typically further comprises a memory for storing said instructions. In an embodiment, the IC comprises a data communication bus between the memory and the instruction scheduler; wherein the memory is adapted to receive a memory address from an address generation unit, the instruction scheduler is adapted to receive the plurality of instructions corresponding to said memory address from said memory over said data communication bus; and wherein the number of instructions in said plurality is a multiple of the number of data processing units in said set. This has the advantage that the use of a shared data bus for instruction and address communication does not lead to an increased latency in instruction scheduling, as the instruction scheduler obtains several sets of instructions in the clock cycles in which the instruction scheduler receives these instructions, such that the instruction scheduler can still issue instructions to the set of data processing units during clock cycles in which data is communicated over the data communication bus.

In an embodiment, the instruction scheduler further comprises a first buffer for storing a firstly received plurality of instructions and a second buffer for storing data-dependent instructions from received plurality of instructions. This allows the instruction scheduler to buffer instructions of which the data dependencies are yet to be evaluated as well as to buffer instructions that have been evaluated but cannot be issued to the data processing units in a single clock cycle because of data dependencies between them.

In an embodiment, the instruction scheduler is adapted to send instructions comprising said data dependencies to the first data processing unit. The instruction scheduler may be further adapted to send no-operation (NOP) instructions to the at least one second data processing unit simultaneously with sending the instructions comprising said data dependencies to the first data processing unit in order to minimize the power consumption of the at least one second data processing unit during idle clock cycles, as the state of the data processing unit is not altered during the execution of NOP instructions.

The IC may further comprise a program counter controller adapted to update a program counter in response to the control signal, which may reside in the instruction scheduler. This for instance ensures that the program counter controller can update the program counter without having to specifically check if the instruction belonging to the actual program counter value has been executed.

The first data processing unit may comprise an interrupt handler, wherein the program counter controller is further responsive to the interrupt handler. This is particularly advantageous if the first data processing unit is a master unit and the at least one second data processing unit is a slave unit, such that the master unit can control the flushing of all the data processing units upon the occurrence of such an interrupt. By making the program counter controller further responsive to the interrupt handler, the program counter controller can calculate the appropriate value of the program counter from the control signal and a signal from the interrupt handler indicating the occurrence of an exception, e.g. an interrupt, branch or jump instruction.

In accordance with another aspect of the present invention, there is provided an electronic device comprising the integrated circuit according to an embodiment of the present invention. Such an electronic device may have a limited power supply, e.g. a battery, which may be a rechargeable battery, and benefits from the improved throughput of the IC in low power mode. The electronic device may be any suitable device, such as, but not limited to, desktop computers, laptop computers, tablet computers, mobile phones, smart phones, personal digital assistants, GPS navigation devices, identification devices, automotive devices, domestic appliances and so on.

In accordance with yet another aspect of the present invention, there is provided a method of scheduling a plurality of instructions in a reduced power mode of an integrated circuit comprising a first data processing unit and at least one second data processing unit, the method comprising evaluating data dependencies between individual instructions in the plurality of instructions; assigning the instructions to the first data processing unit and the at least one second data processing unit for parallel execution in accordance with said data dependencies; and adjusting the operating frequency of the first data processing unit and the at least one second data processing unit as a function of the evaluated data dependencies.

This method provides an operating mode for an IC in which power consumption can be reduced if necessary without the consequential loss of throughput performance.

BRIEF DESCRIPTION OF THE EMBODIMENTS

Figure 2:
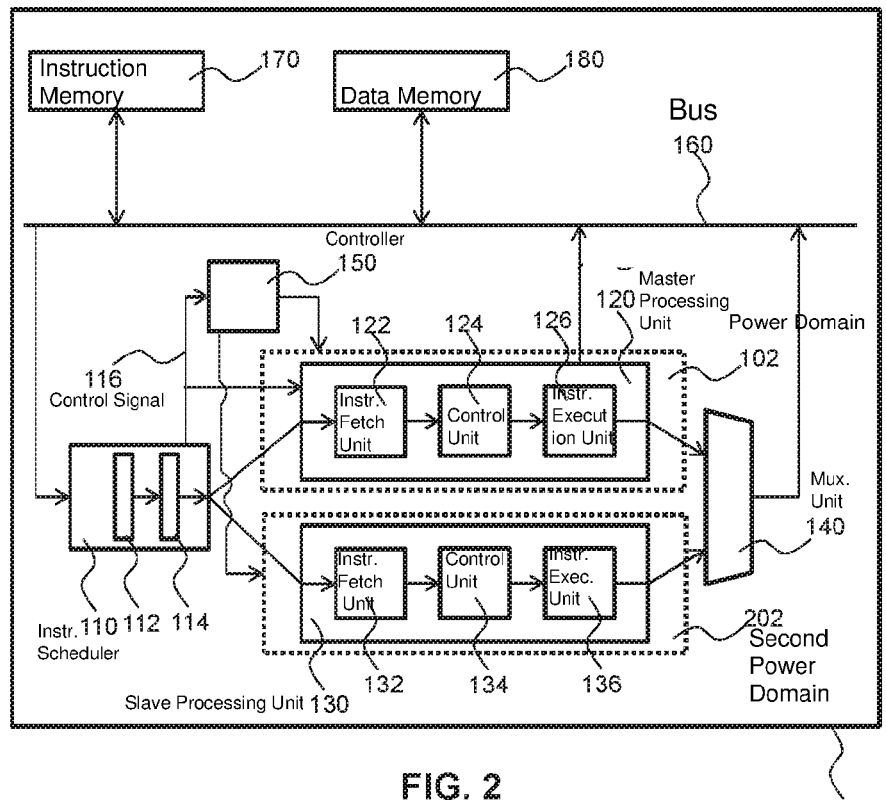
Figure 3:
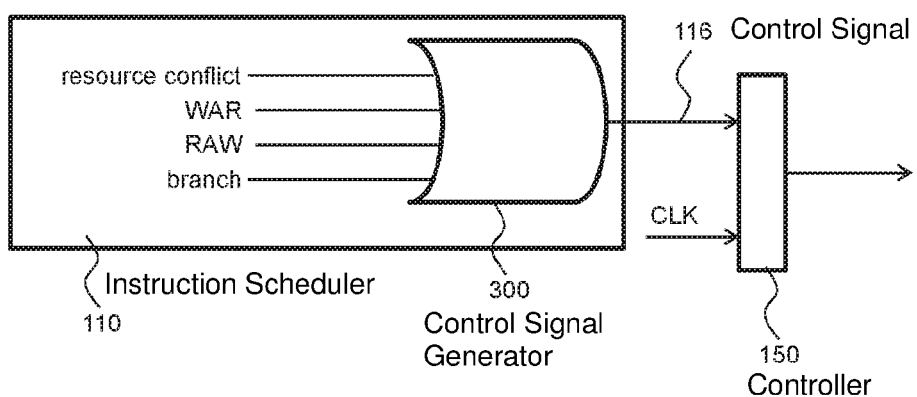
Figure 4:
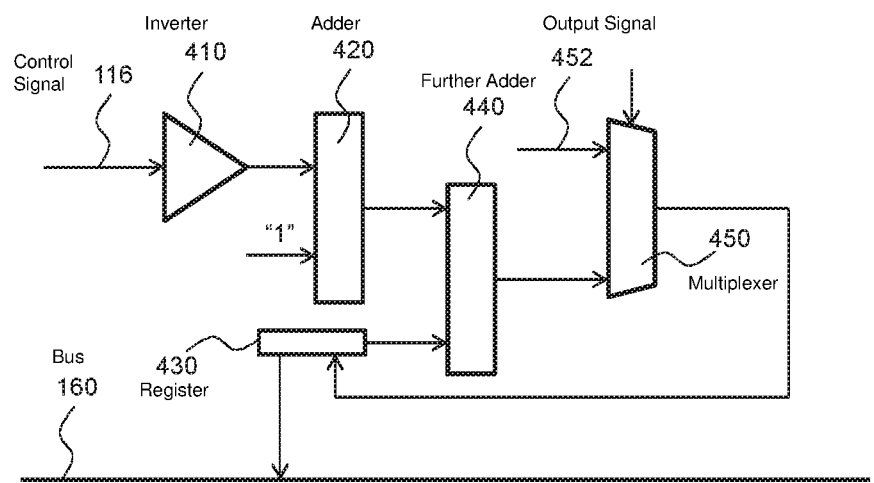
Figure 5:
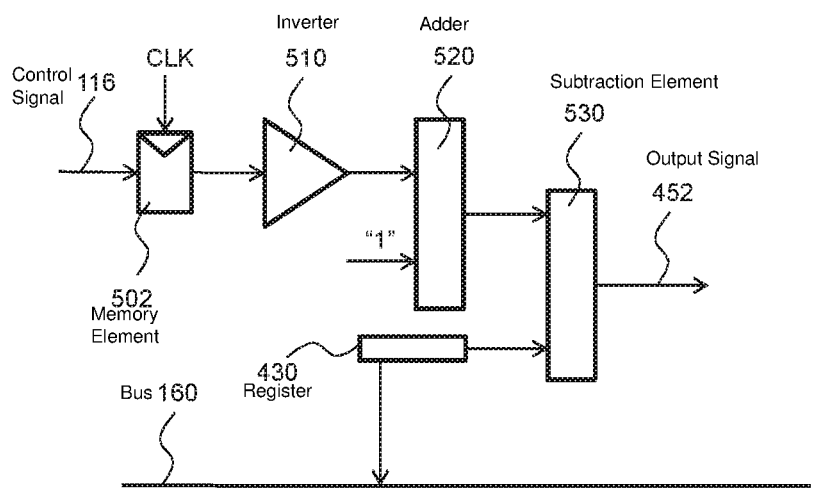
Figure 6:
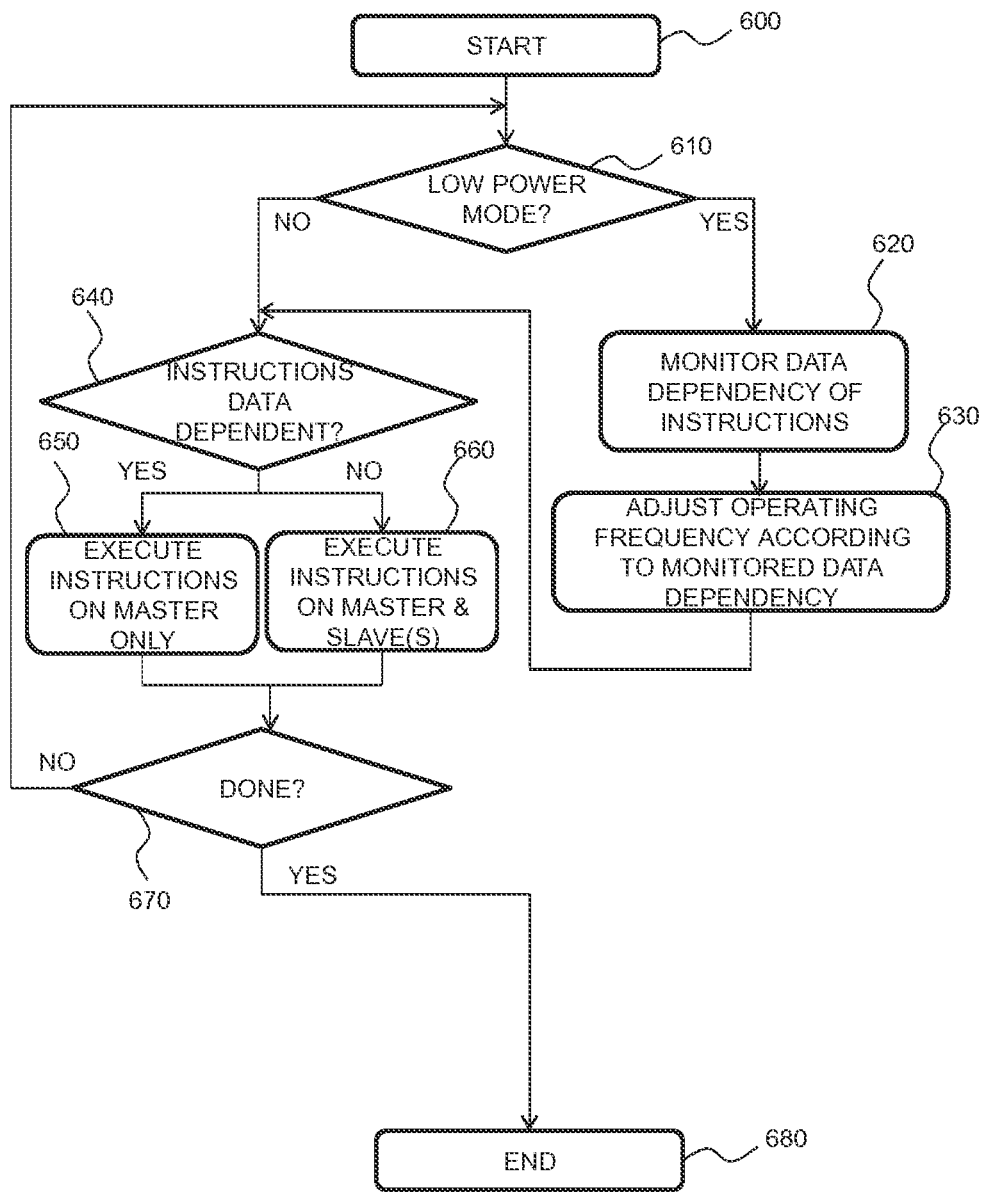
Figure 7:
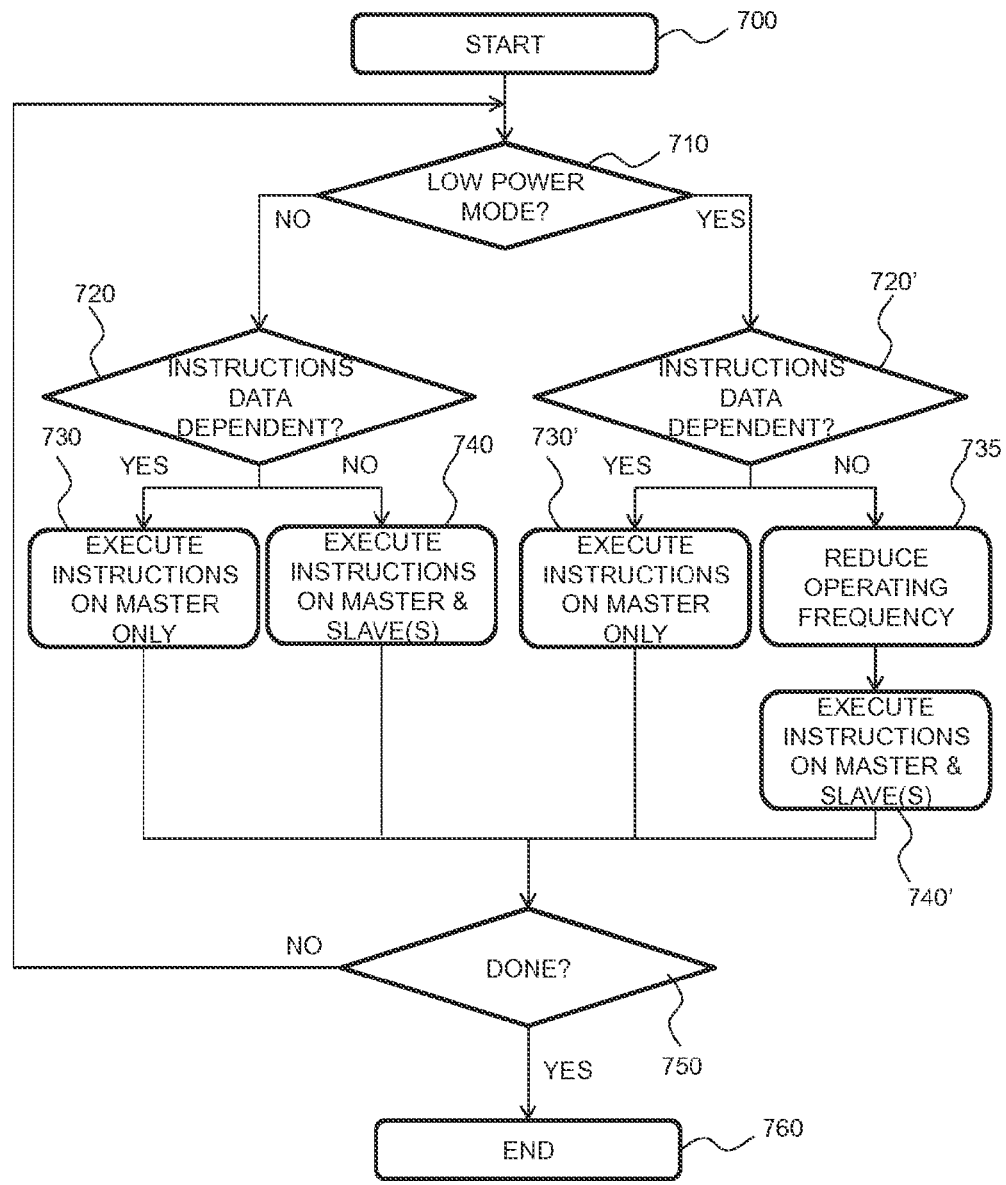

Embodiments of the invention are described in more detail and by way of non-limiting examples with reference to the accompanying drawings, wherein:

FIG. 1 schematically depicts an IC according to an embodiment of the present invention;

FIG. 2 schematically depicts an IC according to another embodiment of the present invention;

FIG. 3 schematically depicts an aspect of an IC according to an embodiment of the present invention;

FIG. 4 schematically depicts another aspect of an IC according to an embodiment of the present invention;

FIG. 5 schematically depicts yet another aspect of an IC according to an embodiment of the present invention;

FIG. 6 schematically depicts a flowchart of a method according to an embodiment of the present invention; and FIG. 7 schematically depicts a flowchart of a method according to an alternative embodiment of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

FIG. 1 schematically depicts an IC 100 according to an embodiment of the present invention. The IC 100 comprises an instruction scheduler 110 for scheduling instructions to a master processing unit 120 and at least one slave processing unit 130. In an embodiment, the IC 100 comprises a single slave processing unit 130. The master processing unit 120 typically comprises an instruction fetch unit 122, a control unit 124 and an instruction execution unit 126. The at least one slave processing unit 130 typically comprises an instruction fetch unit 132, a control unit 134 and an instruction execution unit 136. The fetch and control units typically decode the instruction received from the instruction scheduler 110 and send the appropriate addresses and control signals to the associated register files and instruction execution units as is well known per se in the art. The instruction execution units 126 and 136 execute the instructions and store the result either in register files, e.g. in case the result is to be used in a subsequent instruction, or in data memory 180.

The IC 100 may further comprise a multiplexing unit 140 for combining the data outputs of the master processing unit 120 and the at least one slave processing unit 130. In an embodiment, the multiplexing unit 140 is controlled by the instruction scheduler 110. The data outputs of the master processing unit 120 and the at least one slave processing unit 130 are communicatively coupled to a data communications bus 160, which may be shared with the instruction scheduler 110, although it is equally feasible to include separate data communication buses for communication between the instruction scheduler 110 and the memory 170 on the one hand and between the master processing unit 120 and the at least one slave processing unit 130 and instruction memory 170 and data memory 180 on the other hand.

Although the instruction memory 170 and data memory 180 are shown as separate entities, it will be immediately apparent to the skilled person that any suitable memory architecture may be used, e.g. a shared memory architecture comprising a first memory portion for storing instructions to be provided to the instruction scheduler 110 and a second portion for storing data to be processed by the master processing unit 120 and the at least one slave processing unit 130.

The operation of the IC 100 will now be explained in more detail with the aid of FIG. 6, which depicts a flow chart of an embodiment of the instruction scheduling method of the present invention. Upon initialization in step 600, the IC 100 is configured in step 610 to operate in a selected power mode. The IC may be configured to operate in a full power mode or may be configured to operate in a reduced power mode. Such power modes may be selected based on certain conditions. For instance, the IC may be configured to switch from a full power mode to a reduced power mode upon indication that a battery is becoming depleted or the temperature of the IC has reached a critical value. A full power mode may be selected in the absence of such indicators or in case the IC is connected to mains power, such that there is a reduced need to preserve power.

The selection of the power mode of the IC 100 has implications for the operating mode of the IC, as symbolized by branching step 610 in FIG. 6. If the IC is to operate in a full power mode the method proceeds to step 640, in which the instruction scheduler 110 is configured to evaluate the received instructions in order to detect data dependencies between these instructions. In the presence of such data dependencies, parallel execution of the instructions is not possible, and the method proceeds to step 650 in which the instructions are executed on the first processing unit 120, i.e. on the master processing unit, only. At the same time, the at least one slave processing unit 130 may be clock-gated or may be provided with no-operation (NOP) instructions. The latter has the advantage that the state of the at least one slave processing unit 130 remains unaltered, which is more power-efficient.

The first power mode is maintained until a change in power mode is requested as checked in step 610 or until the computational task performed by the IC 100 has completed, as checked in step 670.

In case of the IC being requested to operate in the low power mode, as checked in step 610, the IC 100 monitors the level of data dependency in the instructions that are issued over a period of time, e.g. over a set number of clock cycles in step 620, and adjusts the operating frequency of the first processing unit 120 and the second processing unit 130 in accordance with this level in step 630 once a sufficient number of clock cycles has been included in the evaluation as determined in step 625. Prior to this sufficient number of clock cycles having been evaluated, the IC 100 may reduce the operating frequency of the of the first processing unit 120 and the second processing unit 130 to a predefined level prior to the adjustment in step 630 to a level based on the expected level of parallelism.

For instance, it may be found during the monitoring of N clock cycles, in which N is a positive integer of at least two but preferably a larger number, 30% of these clock cycles comprised data-dependent instructions that had to be sequentially executed, such that 70% of the monitored clock cycles were dedicated to the execution of parallel instructions. Hence, in step 630 the operating frequency of the first processing unit 120 and the second processing unit(s) 130 may be reduced by 70% to maintain the required minimum level of throughput of the IC 100.

In an embodiment, the instruction scheduler 110 is configured to receive a plurality of instructions from memory 170, in which the plurality of instructions is an integer multiple of the total number of processing units 120, 130 to which the instruction scheduler 110 issues instructions. This is particularly advantageous if the IC 100 comprises a data communications bus 160 that is used for both address and instruction communications to and from memory 170. In such a scenario, the instruction scheduler 110 only receives instructions from memory 170 every other clock cycle, i.e. during the clock cycles not used for sending the instruction addresses to the memory 170.

In order to hide this latency, the instruction scheduler 110 preferably receives a sufficient number of instructions for issuing to the master and slave processing units 120, 130 over at least two clock cycles such that during the clock cycles in which addresses are communicated over the data communication bus 160, the instruction scheduler 110 still has a pool of instructions to issue to the master and slave processing units 120, 130. To this end, the instruction scheduler 110 may comprise a first buffer 112 and a second buffer 114 for storing the sets of instructions to be issued to the master and slave processing units 120, 130. The second buffer 114 is typically used temporarily store the data-dependent instructions that cannot be immediately issued.

The main task of the instruction scheduler 110 is to check the dependency between the instructions and issue the instructions to the master and slave processing units 120, 130 in accordance with the observed dependencies. For instance, in an example in which the IC 100 comprises a master processing unit 120 and a single slave processing unit 130, the instruction scheduler 110 may receive four instructions (A, B, C, D) in a single clock cycle. For the sake of simplicity of this non-limiting example it will be assumed that dependencies can only exist between instructions A, B and C, D respectively and that instruction execution will be done in the same order, i.e. no out of order execution taking place. This leads to the various instruction execution scenarios shown in Table I:

TABLE I

| Dependency evaluation result | Master 120 | Slave 130 |
| --- | --- | --- |
| A, B independent | A | B |
| C, D independent | C | D |
| A, B dependent | A | NOP |
| C, D independent | B | NOP |
|  | C | D |
| A, B independent | A | B |
| C, D dependent | C | NOP |
|  | D | NOP |
| A, B dependent | A | NOP |
| C, D dependent | B | NOP |
|  | C | NOP |
|  | D | NOP |

It is however pointed out for the avoidance of doubt that the present invention is not limited to the above scenarios, and that it should be immediately apparent that more complex dependency scenarios can also be handled by the IC 100 of the present invention.

In an embodiment, the instruction scheduler 110 is adapted to detect the following type of dependencies in the plurality of instructions:

Branch: If one of the instructions is a branch instruction, then the instruction scheduler 110 distributes instruction pairs (A, B or C, D) as dependent instructions. The branch is only executed in the master processing unit 120 as will be explained in more detail below.

Read after write (RAW) dependencies: the result of an earlier instruction (A/C) is an input of a later instruction (B/D). In such a scenario, the earlier instruction must store the result, e.g. write it into a register before the later instruction can be executed.

Resource conflict: such conflicts can occur if the IC 100 uses a single data communication bus 160 for accessing memory 170, e.g. when two instructions in the plurality of instructions both require access to the data communication bus 160, such that parallel execution of these instructions needs to be avoided.

Write after read (WAR) dependencies: such dependencies can occur if an earlier instruction takes several clock cycles to complete and the later instruction has to write to an operand of the earlier instruction, thus introducing the risk that the earlier instruction can be corrupted if the later instruction is executed in parallel.

In a particularly advantageous embodiment of the present invention, the dependency evaluation performed by the instruction scheduler 110 is used to adjust the operating frequency and voltage at which the IC 100 is to operate in the second power mode. As explained above, this may be achieved by monitoring for a given number of clock cycles if data dependencies are detected, which gives an indication of the level of parallelism that can be achieved for a given set of instructions. This information may be utilized that operate the IC 100 in the second power mode at the minimal operating frequency for which over a plurality of clock cycles the average throughput of the IC 100 is maintained at a desired level.

In an alternative embodiment, the dynamic adjustment of the operating frequency in the second power mode of the IC 100 is achieved on a cycle by cycle basis, i.e. without gathering the statistical information in step 620. This alternative embodiment is shown in FIG. 7. In this embodiment, after initializing the IC 100 in step 700, it is decided in step 710 if the IC 100 should operate in a power preserving mode, as already explained in more detail above. If such power preservation is not necessary, i.e. the IC 100 is to be operated in the first power mode, the method proceeds to step 720 in which the instruction scheduler 110 issues data-dependent instructions to the master processing unit 120 only in step 730 or issues instructions to be executed in parallel to the master processing unit 120 and the slave processing unit(s) 130 in step 740 without adjusting the operating frequency of the master and slave processing units.

If on the other hand the IC 100 is to be operated in the second mode in which power is to be preserved, the instruction scheduler 110 evaluates the received instructions in step 720' and issues data-dependent instructions to the master processing unit 120 only in step 730' without adjusting its operating frequency. However, if instructions can be executed in parallel, the method proceeds to step 735 in which the operating frequency of the to the master processing unit 120 and the slave processing unit(s) 130 is reduced, i.e. scaled by factor 1/N in which N is the number of instructions to be executed in parallel, after which the method proceeds to step 740' in which the master processing unit 120 and the slave processing unit(s) 130 execute these instructions at the adjusted, i.e. reduced, operating frequency. It is subsequently checked in step 750 if the execution is complete, with the method terminating in step 760 if this is the case or returning to step 710 otherwise.

The implementation as depicted in FIG. 7 has the advantage over the implementation as depicted in FIG. 6 that a relatively constant throughput per clock cycle is achieved, given that the throughput is not averaged over a large number of clock cycles as is the case in the implementation of FIG. 6. However, as frequent switching between operating frequencies may cause temporary instabilities, e.g. bounce, in the circuits of the IC 100, this implementation is particularly suitable if the IC 100 can operate at the reduced operating frequency for a relatively large number of clock cycles, i.e. if a relatively small number of data dependencies are present between the instructions in the instruction set.

In an embodiment, the IC 100 may further comprise a controller 150 responsive to the instruction scheduler 110 to control the frequency and/or voltage at which the master processing unit 120 and the at least one slave processing unit 130 operates. The controller 150 may be responsive to a control signal 116 issued by the instruction scheduler 112 that indicates if the instruction scheduler 112 is issuing a dependent instruction. This may for example be achieved as shown in FIG. 3. The instruction scheduler 112 may comprise a control signal generator 300, e.g. a logic gate such as a four-input OR gate that generates the control signal 116 if at least one of the aforementioned dependencies has been detected. The control signal 116 is forwarded to the controller 150, which in the absence of such dependencies as indicated by the control signal 116 may scale down the operating voltage of the master processing unit 120 and the one or more slave processing units 130, e.g. as per the implementation as shown in FIG. 7.

In an alternative embodiment, the controller 150 may include a counter further responsive to the clock signal CLK. In this embodiment, the controller 150 may be adapted to count the number of clock cycles in which the control signal 116 indicates the absence (or presence) of such data dependencies between the instructions to be issued over a predefined number of clock cycles. This count can be used to determine the average level of parallelism within the plurality of instructions evaluated by the instruction scheduler 110 and can be used to adjust the operating voltage of the master processing unit 120 and the one or more slave processing units 130 accordingly, e.g. as per the implementation as shown in FIG. 6.

To this end, the controller 150 may further comprise a look-up table (not shown) in which different values of this level of parallelism are associated with the appropriate operating voltage at which for that level of parallelism the required average throughput is achieved over a plurality of clock cycles.

It is noted for the sake of completeness that although FIG. 6 depicts that the monitoring of the level of parallelism in step 620 is performed in the low-power mode, in which case the controller 150 may be inactive in the first (full) power mode, it is equally feasible to perform this evaluation in the first power mode (the full power mode) of the IC 100, which has the advantage that upon entering the second power mode, the appropriate reduced operating voltage can be set more quickly as no initial monitoring cycles are required to determine the average level of parallelism in the instruction set.

It should also be clear that step 620 may be continued even after the appropriate reduced operating voltage has been determined from a first plurality of clock cycles monitored in step 620. In other words, the monitoring may be continued to further improve the accuracy of the selected reduced operating voltage as the evaluation of a larger number of clock cycles are included in this determination.

In FIG. 1, the master processing unit 120 and the one or more slave processing units 130 are located in a single power domain 102 controlled by the controller 150. This embodiment is particularly suitable if the master processing unit 120 and the one or more slave processing units 130 are to be active in the first and second power modes respectively.

In an alternative embodiment, the one or more slave processing units 130 may be deactivated in the full power mode, i.e. the parallel execution of the plurality of instructions only takes place in the reduced power mode, which for instance may be suitable if there is no need to further increase throughput of the IC 100 beyond the required minimum throughput levels. This may be achieved by sending the one or more slave processing units 130 NOP instructions only during the full power mode. Alternatively, as shown in FIG. 2, the master processing unit 120 may be located in a first power domain 102 controlled by the controller 150 and the at least one slave processing unit 130 may be located in a second power domain 202 under control of the controller 150.

In the embodiment of FIG. 2, the second power domain 202 may be kept at a different voltage from the first power domain in the first power mode of the IC 100, e.g. the second power domain 202 may be powered down during sequential processing of the meaningful instructions by the master processing unit 120 only, such as in the first (full) power mode. This embodiment is particularly suitable if the IC 100 is expected to infrequently switch between power modes, such that the power-up time of the at least one slave processing unit 130 in the second power domain 202 does not significantly affect the overall throughput of the IC 100.

In an embodiment, the master processing unit 120 is arranged to execute all types of instructions, e.g. branch instructions, computational instructions and so on. Therefore, in the first, e.g. full, power mode the master processing unit 120 is chosen to execute the (meaningful) instructions sequentially whilst the at least one slave processing unit is provided with NOP instructions only or is otherwise disabled as explained in more detail above. For this reason, the master processor unit 120 may be in charge of updating the program counter of the IC 100. However, as during parallel execution in a low power mode the master processing unit 120 may not 'see' all instructions, the master processing unit 120 needs to be informed of such parallel execution. This may be achieved by the control signal 116.

A non-limiting example of logic suitable to update the program counter in this manner is shown in FIG. 4. In this non-limiting example, the master processing unit 120 comprises an adder 420 that adds the control signal 116 to a fixed value '1'. The control signal 116 may be inverted by an inverter 410 if necessary, e.g. in case the control signal has value '1' to indicate the absence of parallel execution in the current clock cycle. In this case, the adder 420 produces an output value of 1+0=1. In contrast, in the case of such parallel execution, the adder would produce a value of 1+1=2 to indicate that two instructions are executed in parallel during the current clock cycle.

The result of the adder 420 is passed onto a further adder 440 that adds the result of the adder 420 to the value of the program counter in program counter register 430. This result is passed onto a multiplexer 450 that receives the output of the further adder 440 as a first input and the output of an interrupt handler as a second input, as will be explained in more detail below. The multiplexer 450 may be controlled by the interrupt handler, such that in the absence of such an interrupt the program counter in register 430 is updated in accordance with the output produced by the further adder 440.

The instruction scheduler 110 may further comprise an address generator unit (not shown) that forwards a range of addresses to the instruction memory 170 over the data communication bus 160 in order to facilitate delivery of the next plurality of instructions to the instruction scheduler 110. The program counter architecture shown in FIG. 4 may form part of the address generator unit. Alternatively, the address generator unit may reside in any other suitable location e.g., in the controller 150.

As already mentioned, the master processing unit 120 is further responsible for handling interrupts to the flow of instructions processed by the master processing unit 120 and the at least one slave processing units 130. Upon the occurrence of such an interrupt, the master processing unit 120 will flush the current instructions from the fetch unit 122 and the control unit 124 of the master processing unit 120 and from the fetch unit 132 and the control unit 134 of the master processing unit 120 of the at least one slave unit 130.

A non-limiting example embodiment of the portion of the program counter circuitry responsible for updating the program counter in case of the occurrence of such an interrupt is shown in FIG. 5. If an interrupt occurs, the program counter needs to be restored to its value in the clock cycle preceding the instruction causing the interrupt. To this end, this portion of the program counter may comprise a memory element 502 such as a flip-flop or a latch for delaying the progression of this signal by one clock cycle. This delay may of course be implemented in any suitable alternative manner, e.g. using a chain of delay elements such as inverters. The control signal 116 may be inverted by an inverter 510 for the same reasons as explained in the detailed description of FIG. 4.

The (inverted and) delayed control signal 116 is provided as the input of an adder 520 arranged to add a fixed value of '1' to the value of the control signal, to indicate the number of instructions executed in the previous clock cycle. This result is forwarded to a subtraction element 530, which is arranged to subtract the result of the adder 520 from the current value of the program counter in program counter register 430 and to produce the subtraction result as output signal 452. Hence, if the flow of instructions is interrupted, the interrupt handler will instruct the multiplexer 450 to update the program counter using output signal 452.

In summary, embodiments of the IC 100 of the present invention provide a novel approach to implementing instruction level parallelism based on the primary goal of power reduction, which avoids the previously consequential reduction in throughput performance. However, the present invention is not limited to such objectives. Embodiments of the IC 100 of the present invention may advantageously be applied in generic systems where the primary goal varies between throughput performance and energy reduction, depending on the scenario in which the system will be deployed.

The IC 100 according to an embodiment of the present invention may be advantageously be integrated in electronic devices in which such objectives are applicable, e.g. battery-powered devices. Non-limiting examples of such electronic devices include desktop computers, laptop computers, tablet computers, mobile phones, smart phones, personal digital assistants, GPS navigation devices, identification devices, automotive devices, domestic appliances and so on. Because battery life and performance are key performance indicators of such electronic devices, such that the integration of the IC 100 according to the embodiment of the present invention in such devices can significantly improve the market appeal of the device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrated circuit comprising:
 a set of data processing units including a first data processing unit and at least one second data processing unit operable at variable frequencies;
 an instruction scheduler adapted to:
  evaluate a received plurality of instructions to detect data dependencies between individual instructions in the received plurality of instructions;
  generate, in response to the data dependencies, a control signal that indicates whether data dependency was identified between a set of instructions of the plurality of received instructions;
  assign the set of instructions to the first data processing unit and the at least one second data processing unit for parallel execution in response to the control signal indicating a lack of data dependency between the set of instructions; and
  monitor, for instructions received over a period of time, data dependencies indicated by the control signal to determine a level of data dependencies over the period of time; and
 wherein the integrated circuit is operable in a first power mode and a second power mode, the second power mode being a reduced power mode compared to the first power mode, and is adapted to adjust an operating frequency of the first data processing unit and the at least one second data processing unit in the second power mode as a function of the level of data dependencies.

2. The integrated circuit of claim 1, further comprising:
 a controller that includes:
 a first counter for counting instruction sets that have a data dependency indicated by the control signal; and
 a second counter for counting clock cycles of a clock signal; and
 the control configured to adjust said operating frequency in response to the level of data dependencies.

3. The integrated circuit of claim 2, wherein the controller is adapted to determine, for a set number of clock cycles, the fraction of clock cycles in said set of clock cycles in which instructions without data dependencies are assigned by the instruction scheduler, and to adjust said operating frequency in accordance with said fraction following said determination.

4. The integrated circuit of claim 2, wherein the controller is adapted to adjust said operating frequency by controlling the voltage of the data processing units.

5. The integrated circuit of claim 2, wherein the controller is inactive in the first operating mode.

6. The integrated circuit of claim 2, further comprising:
 a memory for storing said instructions; and
 a data communication bus between the memory and the instruction scheduler; and
 wherein:
  the memory is adapted to receive a memory address from an address generation unit;
  the instruction scheduler is adapted to receive the plurality of instructions corresponding to said memory address from said memory over said data communication bus; and
  the number of instructions in said plurality is a multiple of the number of data processing units in said set.

7. The integrated circuit of claim 6, wherein the instruction scheduler further comprises a first buffer for storing the received plurality of instructions and a second buffer for storing data-dependent instructions within said received plurality.

8. The integrated circuit of claim 1, wherein the instruction scheduler is adapted to send sets of instructions to the first data processing unit in response to instructions in the sets of instructions having data dependencies to one another.

9. The integrated circuit of claim 8, wherein the instruction scheduler is further adapted to send no-operation instructions to the at least one second data processing unit simultaneously with sending the sets of instructions to the first data processing unit.

10. The integrated circuit of claim 1, further comprising a program counter controller adapted to update a program counter in response to the control signal.

11. The integrated circuit of claim 10, wherein the program counter controller resides in the instruction scheduler.

12. The integrated circuit of claim 11, wherein the first data processing unit comprises an interrupt handler, and wherein the program counter controller is further responsive to the interrupt handler.

13. The integrated circuit of claim 1, wherein the first data processing unit is a master unit and the at least one second data processing unit is a slave unit.

14. An electronic device comprising an integrated circuit including:
- a set of data processing units including a first data processing unit and at least one second data processing unit operable at variable frequencies;
- an instruction scheduler adapted to:
    - evaluate a received plurality of instructions to detect data dependencies between individual instructions in the received plurality of instructions;
    - generate, in response to the data dependencies, a control signal that indicates whether a data dependency was identified between a set of instructions of the plurality of received instructions;
    - assign the set of instructions to the first data processing unit and the at least one second data processing unit for parallel execution in response to a lack of data dependency between the set instructions; and
    - monitor, for instructions received over a period of time, data dependencies indicated by the control signal to determine a level of data dependencies over the period of time;
- wherein the integrated circuit is operable in a first power mode and a second power mode, the second power mode being a reduced power mode compared to the first power mode, and is adapted to adjust the operating frequency of the first data processing unit and the at least one second data processing unit in the second power mode as a function of the level of data dependencies.

15. A method of scheduling a plurality of instructions in a reduced power mode of an integrated circuit comprising a first data processing unit and at least one second data processing unit, the method comprising:
- evaluating the plurality of instructions to detect data dependencies between individual instructions in the plurality of instructions;
- generating, in response to detected data dependencies, a control signal that indicates whether a data dependency was identified between a set of instructions of the plurality of received instructions;
- assigning the set of instructions to the first data processing unit and the at least one second data processing unit for parallel execution in response to a lack of data dependencies between the set of instructions;
- monitor, for instructions received over a period of time, data dependencies indicated by the control signal to determine a level of data dependencies over the period of time; and
- adjusting the operating frequency of the first data processing unit and the at least one second data processing unit as a function of the level of data dependencies.

* * * * *